Oct. 29, 1940.   W. WRIGHT   2,219,880
PIPE CLAMP
Filed Aug. 10, 1938   2 Sheets-Sheet 1
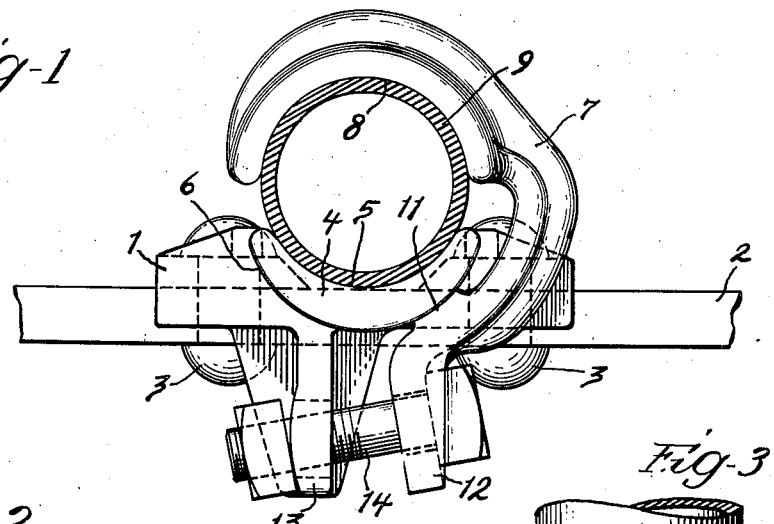
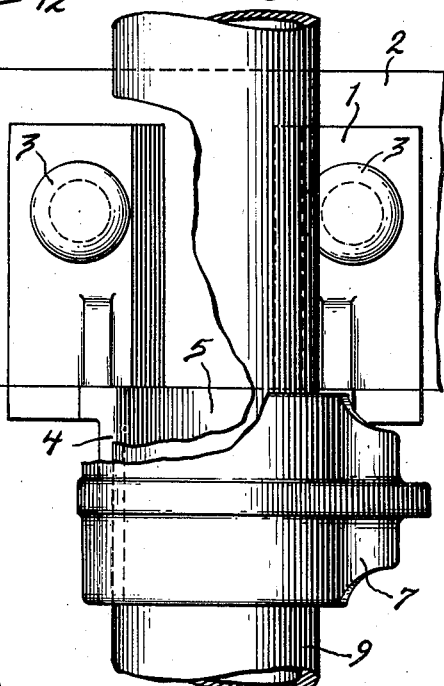
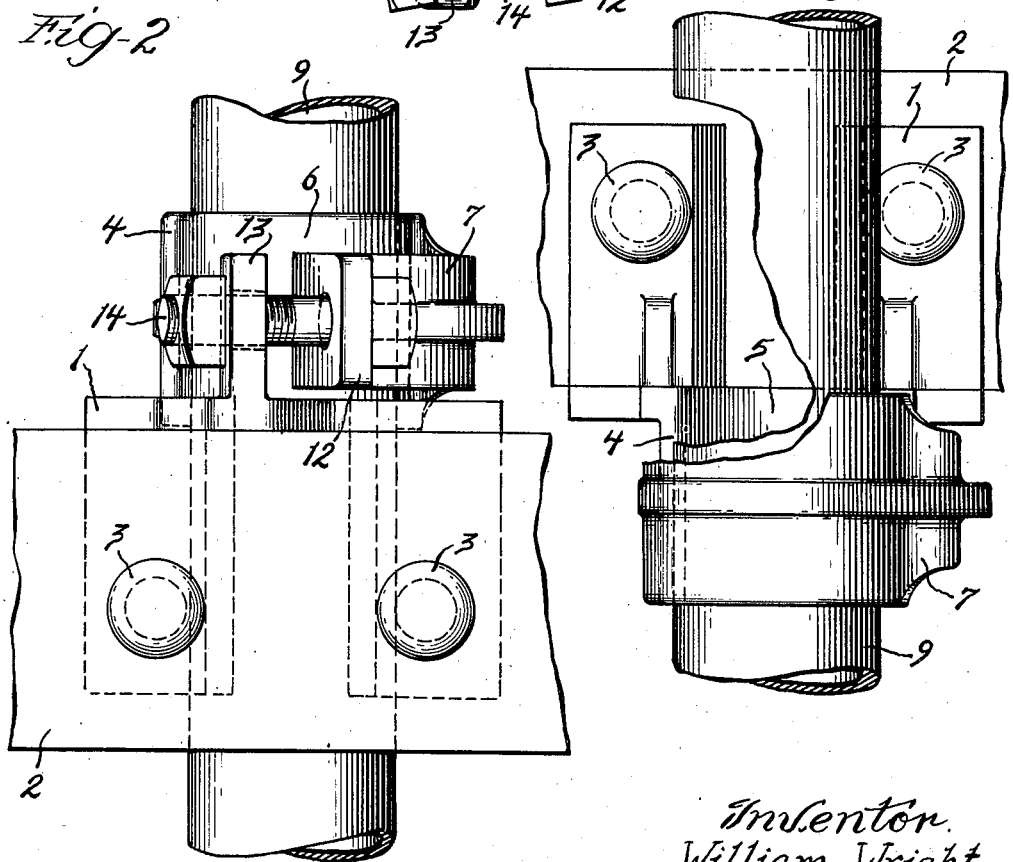
Inventor.
William Wright
By:- Robert F. Miehle,
Atty.

Oct. 29, 1940.   W. WRIGHT   2,219,880
PIPE CLAMP
Filed Aug. 10, 1938   2 Sheets-Sheet 2
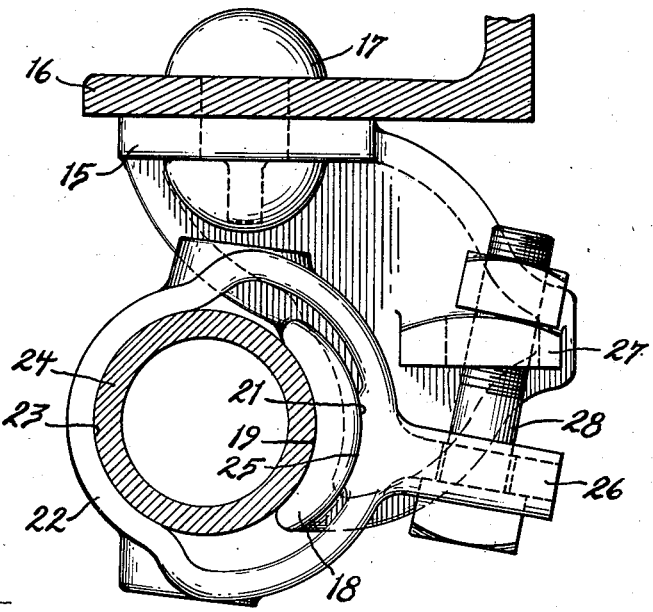
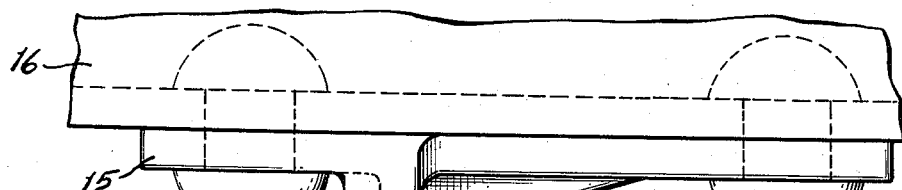
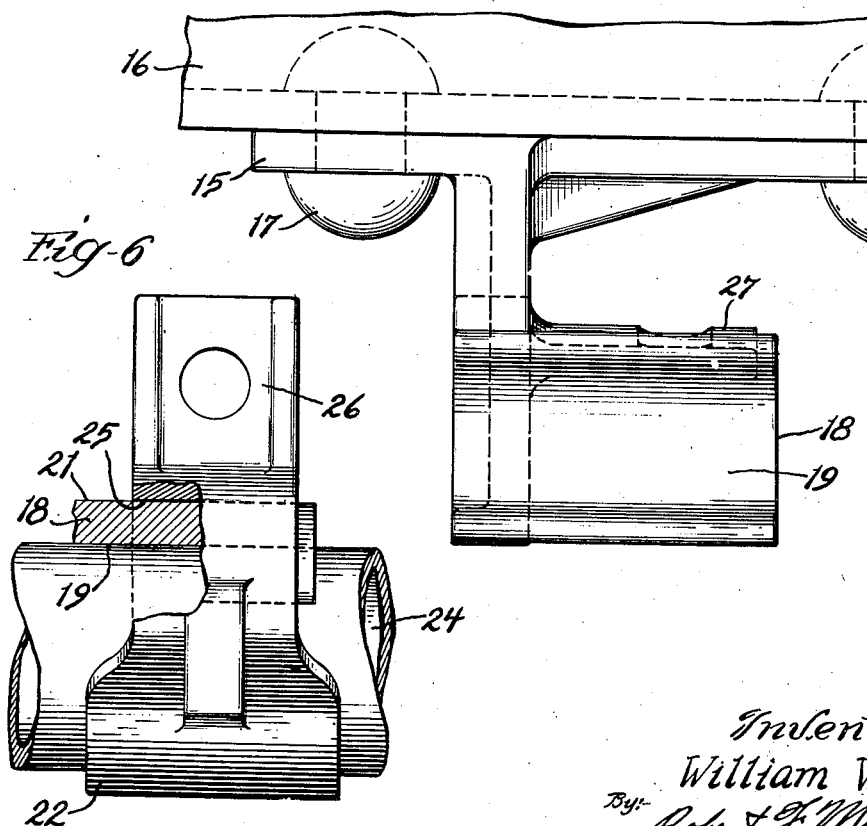
Inventor
William Wright
By:- Robert F. Miehle, Jr.
Atty.

Patented Oct. 29, 1940

2,219,880

UNITED STATES PATENT OFFICE 2,219,880

PIPE CLAMP

William Wright, Chicago, Ill., assignor of one-half to Jay V. Wescott and one-half to Claude M. Baker, both of Chicago, Ill.

Application August 10, 1938, Serial No. 224,198

6 Claims. (Cl. 24—243)

My invention relates particularly to pipe clamps such as are used to secure pipes on railway rolling stock, although not limited to this use alone.

The general object of my invention resides in the provision of a novel and practical pipe clamp which securely clamps a pipe, all with a view toward ease of assembly and economy in manufacture.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is an end elevation of a pipe clamp embodying my invention and showing a pipe in section clamped therein;

Figure 2 is a bottom plan view of the same;

Figure 3 is a top plan view of the same with parts broken away;

Figure 4 is an end elevation of a pipe clamp embodying my invention in a modified form and showing a pipe in section clamped therein;

Figure 5 is a side elevation of one of the pipe clamping members as shown in Figure 4; and Figure 6 is a partial bottom plan view of the structure illustrated in Figure 4 with parts broken away and shown in section.

Referring to Figures 1, 2 and 3 of the drawings, 1 designates a bracket portion of a pipe clamp member 4 which is adapted to be secured to a support 2, as designated at 3. The main portion of the member 4 is segment shaped and is formed integrally with and extends from the bracket portion 1 and provides a concave pipe engaging surface 5 and a convex cam surface 6 eccentric to the axis of this pipe engaging surface.

A second pipe clamping member 7 is of generally crescent shape and provides a concave pipe engaging surface 8 to the end that a pipe 9 may be engaged between the pipe engaging surfaces 5 and 8 of the two pipe clamping members, the pipe clamping member 7 being angularly movable with respect to the mounted pipe clamping member about the axis of the pipe 9 between the pipe clamping members.

The pipe clamping member 7 is provided with a surface 11 facing and spaced from the concave pipe engaging surface 8, and this surface 11 is engageable on the cam surface 6 to effect relative pipe clamping movement of the pipe clamping members with relative angular movement thereof about the axis of the pipe 9 therebetween.

One end of the pipe clamping member 7 is provided with an apertured radial lug 12 and the bracket portion 1 of the mounted pipe clamping member is provided with an apertured lug 13. A screw bolt 14 is engaged through the apertures of the lugs 12 and 13 to effect relative angular movement of the pipe clamping members about the axis of the pipe, which movement effects clamping of the pipe by reason of the cam surface 6 extending eccentrically of the pipe axis and the surface 11 engaging this cam surface. The screw bolt 14 maintains the pipe clamping members in pipe clamping relation.

Concerning Figures 4, 5 and 6, the modification illustrated therein involves the same principle of operation as does the form illustrated in Figures 1, 2 and 3, but differs therefrom structurally.

Referring to Figures 4, 5 and 6, 15 designates a bracket portion of a pipe clamp member which is adapted to be secured to a support 16, as designated at 17. A segment shaped portion 18 is formed integrally with and extends from the bracket portion 15 and provides a concave pipe engaging surface 19 and a convex cam surface 21 eccentric to the axis of this pipe engaging surface.

A second pipe clamping member 22 is of generally annular shape and provides a concave pipe engaging surface 23 to the end that a pipe 24 may be engaged between the pipe engaging surfaces 19 and 23.

The pipe clamping member 22 is provided with a surface 25 engageable with the cam surface 21 for clamping the pipe 24 with relative angular movement of the pipe clamping members as before described.

The pipe clamping member 22 is provided with an apertured radial lug 26 and the bracket portion 15 is provided with an apertured lug 27, and a screw bolt 28 is engaged through the apertures of the lugs 26 and 27 to effect relative angular movement of the pipe clamping members as before described.

Having thus described my invention, I do not wish to be limited to the precise details described, as changes may readily be made without departing from the spirit of my invention, but having thus described my invention, I claim as new and desire to secure by Letters Patent the following:

1. In a pipe clamp the combination of pipe clamping members relatively movable angularly about the axis of a pipe therebetween, and a cam engagement between said clamping members comprising a cam element on one of said clamping members and extending eccentrically about a pipe engaged between said clamping members and a cam engaging element on the other clamping member and engageable with said cam element, said cam and cam engaging elements being so disposed on said clamping members that engagement of said cam and cam engaging elements opposes the clamping member and pipe engagement whereby to effect pipe clamping movement of said clamping members with relative angular movement thereof.

2. In a pipe clamp the combination of pipe clamping members provided with concave pipe engaging surfaces and relatively movable angularly about the axis of a pipe therebetween, one of said clamping members having a segment shape providing the concave pipe engaging surface thereof and a convex cam element eccentric to the axis of the pipe engaging surface, the other pipe clamping member being provided with a cam engaging element facing and spaced from the concave pipe engaging element thereof and engageable on said cam surface to effect pipe clamping movement of said clamping members with relative angular movement thereof.

3. In a pipe clamp the combination of pipe clamping members provided with concave pipe engaging surfaces and relatively movable angularly about the axis of a pipe therebetween, one of said clamping members comprising a bracket portion adapted to be secured to a support and a segment shaped portion extending therefrom and providing the concave pipe engaging element thereof and a convex cam surface eccentric to the axis of this pipe engaging surface, the other pipe clamping member being provided with a cam engaging element facing and spaced from the concave pipe engaging surface thereof and engageable on said cam element to effect pipe clamping movement of said clamping members with relative angular movement thereof.

4. In a pipe clamp the combination of pipe clamping members relatively movable angularly about the axis of a pipe therebetween, a cam engagement between said clamping members comprising a cam element on one of said clamping members and extending eccentrically about a pipe engaged between said clamping members and a cam engaging element on the other clamping member and engageable with said cam element, said cam and cam engaging elements being so disposed on said clamping members that engagement of said cam and cam engaging elements opposes the clamping member and pipe engagement whereby to effect pipe clamping movement of said clamping members with relative angular movement thereof, and adjustable means operative between said clamping members to effect relative angular positioning thereof.

5. In a pipe clamp the combination of pipe clamping members provided with concave pipe engaging surfaces and relatively movable angularly about the axis of a pipe therebetween, one of said clamping members having a segment shape providing the concave pipe engaging surface thereof and a convex cam element eccentric to the axis of this pipe engaging surface, the other pipe clamping member being provided with a cam engaging element facing and spaced from the concave pipe engaging element thereof and engageable on said cam surface to effect pipe clamping movement of said clamping members with relative angular movement thereof, and screw means operative between said clamping members to effect relative angular movement thereof.

6. In a pipe clamp the combination of pipe clamping members provided with concave pipe engaging surfaces and relatively movable angularly about the axis of a pipe therebetween, one of said clamping members comprising a bracket portion adapted to be secured to a support and a segment shaped portion extending therefrom and providing the concave pipe engaging element thereof and a convex cam surface eccentric to the axis of this pipe engaging surface, the other pipe clamping member being provided with a cam engaging element facing and spaced from the concave pipe engaging surface thereof and engageable on said cam element to effect pipe clamping movement of said clamping members with relative angular movement thereof, an apertured lug on said bracket portion, a second apertured lug on said other clamping member, and a screw bolt engaged through the apertures of said lugs to effect relative angular movement of said clamping members.

WILLIAM WRIGHT.